INDICATOR FOR STORAGE DEVICES

Original Filed April 29, 1952

INVENTOR
Horatio N. Crooks
BY Morris Rabkin
ATTORNEY

United States Patent Office
2,851,677
Patented Sept. 9, 1958

2,851,677

INDICATOR FOR STORAGE DEVICES

Horatio N. Crooks, Haddonfield, N. J., assignor to Radio Corporation of America, a corporation of Delaware Continuation of application Serial No. 285,037, April 29, 1952. This application September 23, 1955, Serial No. 536,118

21 Claims. (Cl. 340—174)

Figure 1:
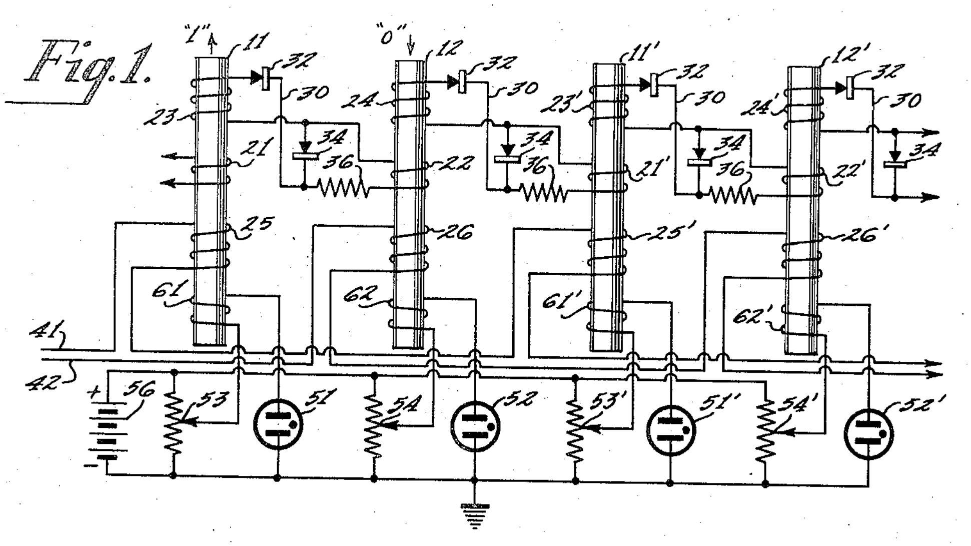

This invention relates to computers and to a static magnetic memory system therefor, and more particularly to an indicator for indicating the information stored in a static magnetic memory.

This is a continuation of the copending application of H. M. Crooks, Serial No. 285,037, filed April 29, 1952, and assigned to the assignee of this application, now abandoned.

Large scale electronic computers use various types of storage or memory devices for storing information until it is to be used by the computer. Among those that have been developed is the static magnetic memory. The latter contains a large number of magnetic elements connected in a line or in an array. The polarity of the residual magnetism in the magnetic elements provides a convenient means for storing information encoded in the binary digital system. For example, the positive and negative polarities may represent "1" and "0" respectively. Due to the stable condition of the polarized magnetic elements, no power is used to maintain the elements in the polarized condition, and the encoded information can be stored idefinitely.

Each of the magnetic elements in a line or array is provided with windings for receiving an appropriate input signal which turns over the polarity of the element, and also with output windings which sense a reversal or turnover in polarity. Due to the change in flux accompanying a change in polarity, there is induced in the output winding a voltage signal representative of the previous polarity of the magnetic element. In the delay line type of memory, the magnetic elements are coupled in series and a turnover of one magnetic element produces a signal in its output winding which is transmitted through a coupling to the input winding of the next element in the series to reverse the polarity of that magnetic element. This type of memory is described in some detail in the following publications: "Magnetic Delay-Line Storage" by An Wang, Proceedings of the I. R. E., volume 39, No. 4, April 1951; "Static Magnetic Memory" by Kincaid et al., Electronics, January 1951. Advancing lines and coils are provided for applying a pulse to reverse the direction of magnetization of the elements where their condition permits, thus advancing the previous condition of polarity down the line.

In order to determine the information stored in a line or array, pulses are applied to the advancing lines to drive or turn over the magnetic elements producing output signals representative of the stored information. The stored information is removed in a similar manner when it is to be used in a computational operation. It can be see that removal of the stored information may destroy it, and additional apparatus would be necessary to reinsert the information in the line. Whether the information is destroyed or restored, it is still necessary to advance the information serially down the line to read it out and use it.

It is evident that it would be desirable to have an arrangement for indicating the condition of polarity of each of the magnetic elements, which arrangement would not require removing or destroying the information stored in the line or array. Similarly, a parallel indicating and storage system would be desirable which would make the information available without changing or otherwise affecting the condition of polarity of the magnetic elements. In other words, an alternative system for reading out the information which does not require changes in polarity of the elements would increase the flexibility and utility of the storage line.

It is, therefore, an object of this invention to provide a novel and inexpensive indicator for the static storage system of a computer.

Another object is to provide a novel and simple storage system operated with a static magnetic storage system for making the stored information available without removing it from the magnetic storage system.

Still another object is to provide a visual indicator for a static magnetic storage system which indicates the state of polarity of the magnetic elements without materially affecting the operation of the system.

Yet another object is to provide a simple visual indicator for a static magnetic storage system which indicates the state of polarity of the magnetic elements and at the same time provides a storage system for removing the information in the storage system without a material increase in power consumption.

These and other objects of this invention are achieved by coupling a glow discharge tube to each of the magnetic elements of a storage line or array. The tube is biased at a potential between its ionizing and deionizing potentials. A coil, wound about one of the magnetic elements, is used to couple the tube biasing circuit to the element. Thus, when the polarity of an element is turned over or shifted, a voltage is induced in the coupling coil producing a change in potential at an electrode of the tube. The change in potential will result in the tube becoming conducting or being extinguished accordingly as the biasing circuit potential is increased or decreased to the ionizing or deionizing potentials respectively. The coupling and winding of the coil can be arranged to produce conduction or non-conduction of the tube to correspond with a shift of polarity to a sensitive or negative condition. For example, the arrangement may be such that a shift to positive polarity will cause the tube to conduct, and to extinguish with a shift to negative polarity. Because of the bias potential, the tubes will be maintained in one of the two stable conditions as long as there is no change in the polarity of their respective associated magnetic elements. Thus, the tubes will indicate the state of polarity of their associated elements and, thereby, the information stored therein. The stable conduction and non-conduction of the tubes also provides a secondary or parallel storage system by means of which the stored information can be viewed by an operator or sensed by appropriate means for computational or other use.

Figure 2:
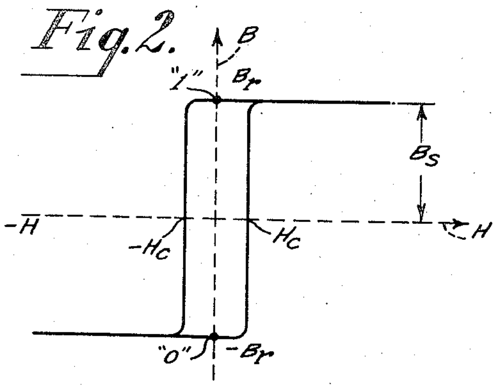
Figure 3:
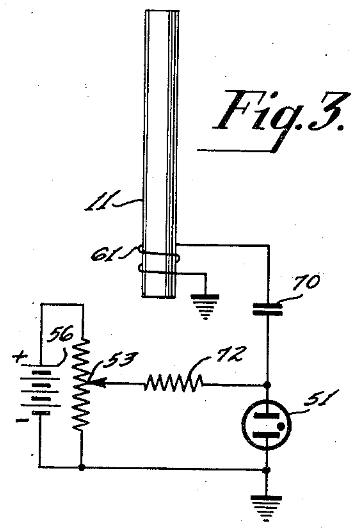
Figure 4:
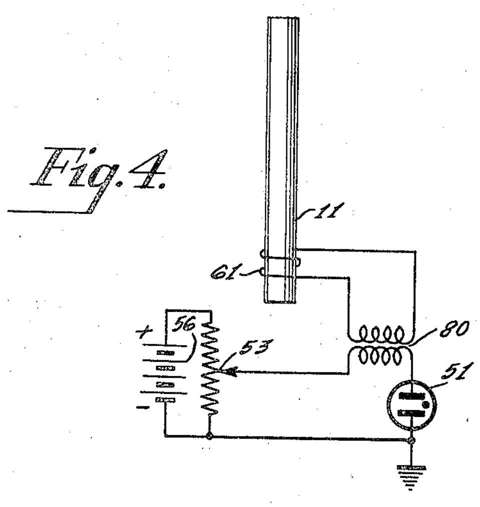

The invention is illustrated in the accompanying drawings, in which:

Figure 1 shows diagrammatically a circuit of an embodiment of the invention applied to a static magnetic delay line, Figure 2 represents the hysteresis loop of a magnetic element, shown to assist in the explanation of the operation of the invention, and Figure 3 and Figure 4 show alternative embodiments of a circuit for coupling the gas tube with an associated magnetic element.

Referring now to Figure 1, an embodiment of the invention is shown as it is applied to a storage device of the static magnetic delay-line type. The delay line comprises a series of coupled magnetic cores 11, 12, 11', 12'. The cores are identical, and each has a magnetic hysteresis characteristic of the type shown in Figure 2, namely, a substantially rectangular loop. As a result of this type of hysteresis characteristic, the application of a positive magnetizing force H produces a large positive residual magnetism $B_r$ in the core, and the application of a negative magnetizing force —H correspondingly produces a large negative residual magnetism $-B_r$.

As can be seen from Figure 2, a magnetomotive force H greater than a critical value $H_c$ is necessary to change the flux density B to saturation $B_s$. When the magnetizing force H is removed, the residual magnetism or flux density $B_r$ is essentially the same as the saturation density $B_s$. In order to change the polarity of the magnetism, say from a positive value "1" to a negative value "0," a magnetomotive force in a negative direction —H must be provided which is of greater magnitude than the critical value $-H_c$. This causes a large change in the flux density B producing a negative residual magnetism $-B_r$ or negative polarity in the core. As can be seen from the hysteresis curve, a magnetizing force less than the critical value $H_c$ does not change the flux density to a value beyond the knee of the curve. Therefore, when that magnetizing force is removed, the residual magnetism $B_r$ in the core is substantially unchanged. Also, if the magnetizing force is in the same direction as the residual magnetism, no change in the residual magnetism is produced. Thus, a magnetic core has two states of substantial stability and it is a suitable means for storing a binary digit. For example, a binary of the form "1" and "0" can be represented respectively by a positive and negative polarity.

As shown in Figure 1, each of the serially connected cores 11, 12, 11′, 12′ has an input winding 21, 22, 21′, 22′, an output winding 23, 24, 23′, 24′ and an advancing winding 25, 26, 25′, 26′. The output winding of one core is linked to the input winding of the succeeding core by appropriate circuits 30. Suitable rectifiers 32, 34 are placed in series 32 and across 34 the leads of the circuits 30, and a resistor 36 is also placed in series in each one of the circuits for a purpose which will be more apparent shortly. The advancing windings 25, 26, 25′, 26′ of alternate cores are connected respectively to one of two advancing lines 41, 42 for receiving advancing pulses.

The delay line operates as follows: Consider the condition where the first core 11 is storing a "1" by means of a positive residual magnetism and the record core 12, a "0" by means of a negative residual magnetism as indicated in the drawing. If a large positive pulse is applied to the first advancing line 41, the magnetizing force produced by the current in the advancing winding 25 shifts or turns over the polarity of the first core 11 to a negative state. The polarities of the advancing pulse and of the advancing windings are such as to tend always to turn over the cores to a negative polarity. Along with that turnover, the change in flux in the magnetic core 11 induces a large positive voltage in the output winding 23 of the first core. The resulting current flows through the serially connected rectifier 32 and the input winding 22 of the second core 12 and applies a large magnetizing force to that core changing its polarity from negative to positive. It can be seen that the advancing pulse transfers the digit "1" stored in the first core 11 to the second core 12.

The purpose of the rectifiers 32, 34 is to isolate the transfer from the first core to the second core. When the second core 12 is shifted from a negative to a positive polarity by a transfer pulse on its input winding 22 from the first core output 23, a negative output is produced in its output winding 24. However, that voltage does not produce any effect on the input coil 21′ of the third core 11′ because it is blocked by the series rectifier 32. Thus, the third core is unaffected by the transfer from the first to the second core. At the same time that the transfer is taking place from the first core, a corresponding transfer is taking place from the third core 11′ to the fourth core 12′ and so on in pairs from odd to even cores down the line of cores caused by that same advancing pulse through the first line 41. If a core is already in a negative state when it receives the advancing pulse on its advancing winding, its polarity is not turned over, and the succeeding core is not changed. It will be seen that this in effect produces a transfer of the negative polarity to the succeeding core which is negative to start with.

It can be seen that the effect of a positive advancing pulse in the first line 41 is to transfer all of the digits stored in the odd-numbered cores 11, 11′ to the even-numbered cores 12, 12′. In a similar manner, positive pulses through the second advancing line 42 transfer the digits stored in the even-numbered cores to the succeeding odd-numbered cores. The purpose of the shunt rectifier 34 and resistor 36 is as follows: When the second core 12 receives an advancing pulse, a voltage is also induced in its input coil 22. In order to prevent any transfer effect on the previous core, the rectifier 34 is shunted across the input coil leads; the resulting current is short circuited through that rectifier 34 and dissipated in the resistor 36.

The digits are stored in alternate cores of the delay line, e. g. the odd-numbered cores 11, 11′. The succeeding alternate cores 12, 12′ are originally in "0" condition, i. e. negatively polarized, in order that they may receive the digit to be transferred from the preceding core. The first advancing pulse transfers the stored digits to the succeeding cores and at the same time zeroes the first set of alternate cores. The second advancing pulse then transfers the digits to the first set of cores one position down the line. Thus, a complete cycle or pair of pulses will transfer each digit stored in one of a pair of cores to the corresponding one of the succeeding pair of cores. It is apparent that during the absence of such advancing pulses, the digits are stored in the cores through the medium of the residual magnetism and a substantially permanent storage is produced.

In the normal operation of a conventional static magnetic delay line described above, the static polarization of the magnetic cores can be determined only when advancing pulses are applied to the magnetic elements of a line to turn over the residual magnetism. The stored digits are thus advanced down the delay line to an output (not shown) where they are removed in the form of signals. However, it is inconvenient to remove the stored information from the delay line to determine what it is. This invention provides means for readily determining the state of polarity of the cores while they remain in a quiescent state through the observation of a series of small gas tubes 51, 52, 51′, 52′, each associated with one core of the delay line.

The tubes shown by way of embodiment are diodes of the cold cathode type having a glow discharge. This type of tube has the characteristic of ionizing or firing when its electrodes are at one potential and deionizing or extinguishing at another potential. A biasing circuit is provided for each tube comprising a potentiometer 53, 54, 53′, 54′ and power source 56. Each potentiometer 53, 54, 53′, 54′ is adjusted so that the voltage applied to the associated tube 51, 52, 51′, 52′ is between the ionizing and deionizing potentials. As a result of such a biasing voltage, the tubes have two stable states, ionized or deionized. The tubes will remain in either of these two states until something causes them to change.

In the embodiment shown, the tubes 51, 52, 51′, 52′ are coupled to their respective magnetic cores 11, 12, 11′, 12′ by a coil 61, 62, 61′, 62′ which senses the shift in polarity in the core. In the circuit shown in Figure 1, the coil is placed in series between the biasing potentiometer 53, 54, 53′, 54′ and the anode of the tube 51, 52, 51′, 52′. The polarity of the coil 61, 62, 61′, 62′, as shown, is chosen to produce conduction in the associated tube when the polarity of the associated magnetic core shifts in a positive direction and to stop conduction when the polarity shifts negatively. This arrangement is merely a matter of choosing a suitable convention.

The indicator operates as follows: The voltage induced in a coil 61, 62, 61', 62' by the turning over of the polarity of an associated core 11, 12, 11', 12', changes the potential at the anode of an associated tube 51, 52, 51', 52'. For example, as shown in the drawing, when the polarity of the second core 12 is shifted from a negative to a positive state during a transfer of a "1" from the first core 11 the change of the magnetic flux in the second core induces a voltage in the coil 62 coupled thereto. The polarity of this induced voltage is the same as the polarity of the biasing voltage. Thus, the potential at the anode of the tube 52 is increased. The magnitude of the induced voltage which results from a complete turnover in polarity is sufficient to raise the anode potential above the ionizing potential. This causes the tube 52 to fire, and an indication of the new polarity of the core 12 is produced. Similarly, when the second core 12 is changed to a negative polarity by a pulse through the second advancing line 42, the induced voltage in its sensing coil 62 is of sufficient magnitude to decrease the potential at the anode to below the deionizing potential, causing the tube 52 to extinguish. If the change in flux density is small, which might result when the magnetizing force is in the same direction as the existing polarity, the magnitude of the induced voltage in the sensing coil is not great enough to change the potential at the anode to a point above or below its critical values. Thus, the tube will continue in either one of its stable states until the polarity of its associated magnetic core is reversed. In effect, the voltage-current characteristic of the glow discharge tube, when it is biased between its ionizing and deionizing potentials and operated as described, form a hysteresis loop analogous to that of the magnetic core. Consequently, a properly biased glow discharge tube is ideally suited as an indicator for a magnetic storage core.

In summary: A glow tube indicator is provided which is biased between its ionizing and deionizing potentials and coupled by means of a sensing coil to an associated magnetic core in a storage device. A change in polarity in the core produces a voltage in the sensing coil which causes the tube to fire or extinguish accordingly as that voltage aids or opposes the bias potential. Thus, a one-to-one correspondence of a stable conduction or non-conduction of an indicating tube is provided to indicate the stable positive or negative polarity of its magnetic core. The tube maintains its stable condition as long as the polarity of the magnet remains unchanged.

It should be noted that the series of glow tube indicators also serves as a secondary storage device. If appropriate sensing means such as photoelectric tubes are used, the tubes provide a convenient means for removing the information stored in the magnetic cores without driving or turning over the cores themselves. Thus, the operation of a delay line can be observed and checked, and also, information can be read out of it in a parallel fashion.

The operation of the glow discharge tubes does not materially affect the operation of the delay line. The power to drive the sensing coil is relatively small, and furthermore, when the tube is conducting, it adds but a relatively small amount of magnetizing force to the core.

An alternative means for coupling the sensing coils 61, 62, 61', 62' to a corresponding glow tube 51, 52, 51', 52' is shown in Figure 3. A coupling condenser 70 and a resistor 72 are used to connect the sensing coil 61 on the magnetic core 11 to the biasing circuit of the tube 51. The condenser 70 transmits the positive and negative voltages induced in the sensing coil 61 to the tube anode and the tube 51 operates as described above. By means of this type of coupling, the direct current through the glow tube is not permitted to affect the magnetism in the magnetic core.

Another type of alternating current coupling is shown in Figure 4. A transformer 80 is used to couple the sensing coils 61, 62, 61', 62' to the biasing circuits of the tubes 51, 52, 51', 52'. The operation of this coupling is similar to the condenser-resistor coupling described above. The transformer serves to transmit the induced voltages to the anode of the tube, which results in its ionizing and deionizing as described above.

While applicant's invention is shown as embodied in a static magnetic delay line, it is apparent that its utility is not restricted thereto. It can also be used in oher storage devices such as those in which the magnetic cores are arranged in the form of an array.

It is evident that this invention provides a simple and inexpensive indicator for continuously indicating the polarity of the magnetic cores of a static computer storage system without changing their polarity. At the same time that indications are made available, a second stable storage system is provided. The operation of the indicator does not materially affect the operation of the storage system of the computer, and it does not require a significant increase in power.

What is claimed is:

1. The combination of a magnetic core having a substantially rectangular hysteresis characteristic, means for reversing the polarity of said magnetic core between positive and negative states of substantial saturation, a gas discharge tube having two electrodes and characterized by ionizing and deionizing potentials, means for biasing said tube at a potential between said ionizing and deionizing potentials, means responsive to a reversal of said polarity to one of said states for producing a positive voltage and correspondingly responsive to a reversal to the other of said states for producing a negative voltage, and means for applying said positive and negative voltages to one of said electrodes to increase and reduce said biasing potential whereby said tube will be ionized and deionized respectively to indicate said polarity of said magnetic core.

2. The combination of claim 1 wherein said responsive means includes a coil and said applying means includes connections placing said coil in series with said biasing means and said one electrode.

3. The combination of claim 1 wherein said responsive means includes a coil and said applying means includes a condenser coupling said coil to said one electrode.

4. A static storage system comprising a first storage device including a plurality of bistable polarized elements, means for shifting the polarity of each said element from one stable extreme of substantial saturation to another stable extreme of substantial saturation, each of said elements being capable of following a hysteresis loop upon being shifted from one polarity to the other, and separate means for each of said elements responsive to a shift in the polarity of the associated element for producing an electric signal representative of the new polarity of said associated element; a secondary storage device in parallel with said first storage device including a plurality of visual indicating devices, each corresponding to one of said polarized elements, each of said indicating devices having a separate means for regulating the associated device to have two stable conditions representative respectively of said element polarities, to be responsive to said electric signal to change from one stable condition to the other, and to cause said associated device to follow a hysteresis loop upon the changing between said stable conditions; and means coupling each of said polarity shift responsive means to the corresponding one of said indicating devices whereby each of said indicating devices is changed to one of said conditions upon a shift in polarity of the corresponding element to represent said new polarity and said indicating device is maintained in that condition until another shift in polarity.

5. A static storage system as recited in claim 4 wherein each said indicating device comprises a glow discharge tube having different firing and extinction potentials, and said regulating means comprises a circuit for biasing said tube between said firing and extinction potentials whereby said tube will fire or extinguish accordingly as said polarized element is shifted to one polarity or to the other.

6. In a static magnetic storage system of the type including a plurality of magnetic elements having a substantially rectangular hysteresis characteristic and two opposite polarities of substantial saturation, means to establish information in said system, said information being represented by one or the other remnant polarity of substantial saturation of each said element, and means to transfer information from said system, the combination therewith of apparatus for indicating the information stored in said system comprising a different glow discharge tube associated with each of said elements, each of said glow discharge tubes having different firing and extinction potentials, means to bias each of said glow discharge tubes between said firing and extinction potentials, means coupled to each of said magnetic elements for detecting a voltage representative of the saturation polarity being established in said element, and means to combine said detected voltage with the bias of the associated glow discharge tube to place said associated glow discharge tube in a fired or extinguished condition as determined by the polarity of said detected voltage whereby the saturation condition of each of said magnetic elements is represented by the condition of its associated glow tube.

7. A static magnetic delay line comprising a first storage line including a series of coupled magnetic cores, each of said cores having a substantially rectangular hysteresis characteristic and each having an input, an output, and an advancing winding, each of said output windings being coupled to the input winding of the succeeding core for transferring stored information to said succeeding core, a first and a second advancing means for transmitting advancing pulses to said cores whereby the polarity of each of said cores may be turned over between positive and negative states of substantial saturation and said stored information transferred, said first and second advancing means being coupled respectively to alternate ones of said advancing windings, separate means for each of said cores responsive to said turnover of polarity for producing a voltage representative of the new polarity of each of said elements, each of said responsive means including a sensing winding inductively coupled to said core; a secondary storage device in parallel with said first storage line including a plurality of cold cathode glow diodes, each of said diodes being associated with one of said magnetic cores, each of said diodes having different firing and extinction potentials, and a biasing circuit for biasing each of said diodes between said potentials; and means coupling each of said sensing windings to its associated diode whereby each diode will fire or extinguish accordingly as its associated core shifts to a positive or negative polarity thereby providing a visual indication of said new polarity.

8. A static storage device as recited in claim 7 wherein said coupling means includes separate connections placing each of said sensing windings in series with said biasing means and one of the electrodes of the associated one of said diodes.

9. A static storage device as recited in claim 7 wherein said coupling means includes a separate resistor and condenser for each of said diodes.

10. A static storage device as recited in claim 7 wherein said coupling means includes a separate transformer for each of said diodes.

11. The combination of a magnetic core having a substantially rectangular hysteresis characteristic, means for applying magnetomotive forces of opposite polarities to said core to change the magnetization of said core to two opposite states of said characteristic, a gas discharge tube having a plurality of electrodes and characterized by ionizing and deionizing potentials, means for biasing said tube at a potential between said ionizing and deionizing potentials, coil means linked to said core and responsive to a change of said core to one of said magnetization states for producing a positive voltage and correspondingly responsive to a change of said core to the other of said states for producing a negative voltage, and means for applying said positive and negative voltages to one of said electrodes to change said baising potential.

12. The combination of a magnetic core having a substantially rectangular hysteresis characteristic, coil means linked to said core for applying magnetomotive forces of opposite polarities to said core to change the magnetization of said core respectively to two different states of said characteristic, a gas discharge tube having a plurality of electrodes and characterized by ionizing and deionizing potentials, means for biasing said tube at a potential between said ionizing and deionizing potentials, a coil linked to said core and responsive to a change of said core to one of said magnetization states for producing a positive voltage and correspondingly responsive to a change of said core to the other of said states for producing a negative voltage, and means coupling said coil in circuit with one of said electrodes for applying said positive and negative voltages thereto to change the ionization state of said tube responsive to a change of the magnetization state of said core.

13. The combination of a magnetic core having a substantially rectangular hysteresis characteristic, means for reversing the polarity of said magnetic core between positive and negative states of substantial saturation, a gas discharge tube having two electrodes, said tube being capable of being ionized and deionized at different potentials, means for biasing said tube at a potential between said ionizing and deionizing potentials, means responsive to a reversal of said core polarity to one of said states for producing a voltage, and means for applying said voltage to one of said electrodes to change the potential applied to said tube whereby said tube will be ionized to indicate said polarity of said magnetic core.

14. A static storage system comprising a first storage device including a plurality of bistable polarized elements, means for changing each of said elements from one polarity to another, and means responsive to changes of polarity of said elements to said another polarity for producing a plurality of signals each corresponding to a different one of said elements; a secondary storage device in parallel with said first storage device including a plurality of visual indicating devices each corresponding to a different one of said polarized elements, each of said indicating devices having two stable conditions representative respectively of said polarities, said indicating devices being responsive to said electrical signals to change from one of said stable conditions to the other; and means for changing the conditions of said indicating devices, said device changing means including means coupling said first storage device to said secondary storage device to apply said plurality of electrical signals to the corresponding ones of said indicating devices whereby the conditions of said indicating devices are representative of the polarities of the corresponding polarized elements.

15. In a static magnetic storage system of the type including a plurality of magnetic elements each having a substantially rectangular hysteresis characteristic with two conditions of substantial saturation, and means for establishing information in said system by changing the saturation conditions of said elements, the combination therewith of apparatus for indicating the information stored in said system comprising a different glow discharge tube associated with each of said elements, each of said glow discharge tubes being capable of being fired and extinguished at different potentials, means for biasing each of said glow discharge tubes between said firing and extinction potentials, means responsive to changes of saturation of said elements to one of said conditions for producing a plurality of voltages each corresponding to a different one of said elements, and means to combine each of said produced voltages with the bias of the associated glow discharge tube to place said associated glow discharge tube in a fired condition whereby the saturation condition of each said magnetic element is represented by the condition of its associated glow tube.

16. The combination of a magnetic core having a substantially rectangular hysteresis characteristic, means for applying magnetomotive forces of opposite polarities to said core to change the magnetization of said core to two opposite states, a gas discharge tube having a plurality of electrodes, said tube being capable of being ionized and deionized at different potentials, means for biasing said tube at a potential between said ionizing and deionizing potentials, means including a coil linked to said core and responsive to a reversal of said core polarity to one of said magnetization states for producing a voltage, and means for applying said voltage to one of said electrodes to change said biasing potential.

17. The combination of a magnetic core, coil means linked to said core for applying magnetomotive forces of opposite polarities to said core to change the magnetization of said core respectively to two different states, a gas discharge tube having a plurality of electrodes, said tube being capable of being ionized and deionized at different potentials, means for biasing said tube at a potential between said ionizing and deionizing potentials, means including a coil linked to said core and responsive to a reversal of said core polarity to one of said magnetization states for producing a voltage, and means coupling said voltage producing means in circuit with one of said electrodes for applying said voltage thereto to change the ionization state of said tube responsive to a change of the magnetization state of said core.

18. An electronic computer condition indicator comprising, in combination, a storage system including a magnetic shift register composed of a series of electrically coupled bistable magnetic cores which is capable of stepping a circuit condition therealong by change of state of the cores, and means for supplying pulses to an input of said shift register for step-by-step advancement of said circuit condition from core to core therealong; a display means including a plurality of similar gaseous glow discharge devices each characterized by having two electrodes and requiring a higher voltage to start a discharge therein than is required to sustain a discharge therein, and means for applying a sustaining voltage across each of said devices; and means electrically connecting an output core of said shift register with one discharge device of said display means, said connecting means being responsive to a reversal of said output core polarity for providing a starting voltage to discharge said one device.

19. An indicator system comprising, in combination, a storage system including a magnetic shift register composed of a series of electrically coupled bistable magnetic cores for stepping along a stored magnetic condition by changes of state of the cores, and means for changing the states of the cores; a display means including a plurality of similar glow discharge devices each having two electrodes and requiring a higher voltage to start a discharge therein than is required to sustain a discharge therein, each of said devices being associated with a different one of said cores, and means for supplying a sustaining voltage across each of said devices; and means for coupling one of said register cores with the associated one of said discharge devices, said coupling means being responsive to a reversal of said one register core polarity for providing a voltage to initiate discharge of said associated discharge device.

20. A static storage system comprising a first storage device including a plurality of bistable polarized elements each having a substantially rectangular hysteresis characteristic, means for shifting the polarity of each of said elements from one stable state of substantial saturation to the opposite stable state of substantial saturation of said characteristic, separate means for each of said elements responsive to the shift from said one of said states to the other for producing an electric signal representative of said change of state; a secondary storage device including means for connecting such device in parallel with said first storage device, a plurality of visual indicating devices each corresponding to one of said polarized elements, each of said indicating devices having two stable conditions and being responsive to said electric signal to change from one of said stable conditions to the other, and separate means for each said indicating device for regulating said change of said device from said one of said stable conditions to the other; and means coupling each said responsive means to its corresponding regulating means whereby each of said indicating devices is changed to said other of said stable conditions upon said change of state of said polarized element.

21. In a static information storage system, the combination of a static storage element having a substantially rectangular hysteresis characteristic and two states of remanent polarization on said characteristic, means coupled with said element for changing said element from one of its states of polarization to the other of said states, a further means coupled with said element to produce a voltage responsive to said change of state of polarization of said element, a gas discharge tube having at least two electrodes and having an ionizing potential and a lower deionizing potential, means to bias said tube at a potential between said ionizing and deionizing potentials, and means coupling said further coupled means with one of the electrodes of said tube to apply said voltage to said electrode to vary the voltage thereon to a point outside of the range between said ionizing and deionizing potentials.

References Cited in the file of this patent

UNITED STATES PATENTS

| | | |
|---|---|---|
| 2,402,989 | Dickinson | July 2, 1946 |
| 2,582,480 | Dimond | Jan. 15, 1952 |
| 2,610,793 | Krause | Sept. 16, 1952 |
| 2,652,501 | Wilson | Sept. 15, 1953 |
| 2,666,195 | Bachelet | Jan. 12, 1954 |
| 2,697,178 | Isborn | Dec. 14, 1954 |